US009816290B2

(12) United States Patent
Yamaguchi

(10) Patent No.: US 9,816,290 B2
(45) Date of Patent: Nov. 14, 2017

(54) KEY CYLINDER DEVICE

(71) Applicant: KABUSHIKI KAISHA TOKAI RIKA DENKI SEISAKUSHO, Aichi (JP)

(72) Inventor: Toshiaki Yamaguchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/157,010

(22) Filed: May 17, 2016

(65) Prior Publication Data
US 2016/0348397 A1   Dec. 1, 2016

(30) Foreign Application Priority Data

May 29, 2015   (JP) .................................. 2015-110672

(51) Int. Cl.
| | |
|---|---|
| *E05B 29/00* | (2006.01) |
| *E05B 9/04* | (2006.01) |
| *E05B 77/44* | (2014.01) |
| *E05B 85/06* | (2014.01) |
| *B60R 25/02* | (2013.01) |

(52) U.S. Cl.
CPC ............ *E05B 29/0053* (2013.01); *E05B 9/04* (2013.01); *E05B 29/00* (2013.01); *E05B 77/44* (2013.01); *E05B 85/06* (2013.01); *B60R 25/02* (2013.01)

(58) Field of Classification Search
CPC . E05B 9/04; E05B 9/048; E05B 27/00; E05B 27/0003; E05B 27/0007; E05B 27/001; E05B 27/0014; E05B 29/00; E05B 29/0053; E05B 29/006; E05B 77/44; E05B 85/02; E05B 85/06
See application file for complete search history.

(56) References Cited

U.S. PATENT DOCUMENTS

| | | | | |
|---|---|---|---|---|
| 2,111,098 | A | * | 3/1938 | Segal .................... E05B 27/001 70/378 |
| 4,761,977 | A | * | 8/1988 | Weatherby ............ E05B 13/108 70/377 |
| 5,134,871 | A | * | 8/1992 | Makino ................... E05B 29/00 70/377 |
| 5,640,864 | A | * | 6/1997 | Miyamoto .......... E05B 17/0058 70/360 |
| 5,732,580 | A | * | 3/1998 | Garnault ................. E05B 17/04 70/360 |

(Continued)

FOREIGN PATENT DOCUMENTS

JP      2014-177802 A      9/2014

*Primary Examiner* — Christopher Boswell
(74) *Attorney, Agent, or Firm* — Roberts Mlotkowski Safran Cole & Calderon P.C.

(57) ABSTRACT

A key cylinder device includes a cylindrical rotor case, a rotor rotatably enclosed in the rotor case, a sleeve fixedly disposed between the rotor and the rotor case, and a tumbler moving in a radial direction inside the rotor by insertion and extraction of a mechanical key into and from the rotor. The sleeve includes a hole not engaged with the tumbler by the insertion of the mechanical key and engaged by the extraction of the mechanical key, and a dividing wall formed at a middle of the hole, the dividing wall receiving the tumbler. A part of the dividing wall is engaged with a recessed groove formed on an inner peripheral surface of the rotor case.

5 Claims, 3 Drawing Sheets

(56) References Cited

U.S. PATENT DOCUMENTS

| | | | | |
|---|---|---|---|---|
| 7,770,424 B2* | 8/2010 | Tamezane | ............... | E05B 29/00 |
| | | | | 70/373 |
| 7,823,427 B2* | 11/2010 | Katagiri | .................. | E05B 17/04 |
| | | | | 70/379 R |
| 8,276,416 B2* | 10/2012 | Boesel | .................... | E05B 29/00 |
| | | | | 70/337 |
| 2016/0024815 A1 | 1/2016 | Ino et al. | | |
| 2016/0194900 A1* | 7/2016 | Tsuruta | ............... | E05B 29/0013 |
| | | | | 70/377 |

* cited by examiner

KEY CYLINDER DEVICE

The present application is based on Japanese patent application No. 2015-110672 filed on May 29, 2015, the entire contents of which are incorporated herein by reference.

BACKGROUND OF THE INVENTION

1. Field of the Invention

The invention relates to a key cylinder device.

2. Description of the Related Art

An example of key cylinder devices known is a cylinder lock for locking and unlocking a door lock mechanism equipped in a vehicle door see e.g. JP-A-2014-177802).

JP-A-2014-177802 discloses a cylinder lock that is provided with inner and outer cylinders. The inner cylinder has a keyhole into which a mechanical key is inserted. The outer cylinder encloses the inner cylinder to be relatively rotatably inserted and held, and is rotatably held by a fixed housing.

The inner cylinder is provided with half tumblers which can be engaged with the outer cylinder and disengaged from the outer cylinder upon insertion of the mechanical key into the keyhole.

The outer cylinder is provided with two pairs of engaging grooves at an inner periphery thereof which extend along an axial direction and sandwich a dividing wall therebetween. The half tumblers are biased by a spring toward a side where they are engaged with the two pairs of engaging grooves.

When the mechanical key is not inserted into the keyhole of the inner cylinder, the half tumblers are engaged with the engaging grooves of the outer cylinder. When the mechanical key is inserted into the keyhole, the half tumblers are disengaged from the engaging grooves of the outer cylinder.

SUMMARY OF THE INVENTION

Unlike the door cylinder lock described above, ignition cylinders for changing the state of an engine is constructed such that an outer cylinder thereof is held by a fixed housing to be not rotatable. Due to the construction, in case of an illegal conduct such as unlocking of the cylinder lock by forcibly rotating the inner cylinder, the dividing wall formed between the two pairs of engaging grooves of the outer cylinder may receive a strong force from the half tumblers forcibly rotated with the inner cylinder.

The half tumblers rotating along with the forced rotation of the inner cylinder may break the dividing wall of the outer cylinder, allowing the illegal unlocking of the cylinder lock. For this reason, the dividing wall of the outer cylinder needs to have strength enough to withstand the concentrated force.

The strength of the dividing wall of the outer cylinder may be enhanced by increasing a radial thickness of the outer cylinder. However, increasing the thickness of the outer cylinder causes an increase in the outer diameter of the outer cylinder, resulting in an undesired increase in volume of the entire cylinder lock.

Also, the strength of the dividing wall may be enhanced by increasing a circumferential thickness of the dividing wall of the outer cylinder. However, since the distance between the two pairs of half tumblers which are engaged with the two pairs of engaging grooves is defined by a certain standard, it is difficult to increase the circumferential thickness of the dividing wall of the outer cylinder.

Even if the circumferential thickness of the dividing wall of the outer cylinder is increased, the outer diameter of the outer cylinder may be increased to allow the undesired increased size of the entire cylinder lock.

It is an object of the invention to provide a key cylinder device that the strength of cylinder can be increased without increasing the size of the entire device.

(1) According to an embodiment of the invention, a key cylinder device comprises:

a cylindrical rotor case;

a rotor rotatably enclosed in the rotor case;

a sleeve fixedly disposed between the rotor and the rotor case; and a tumbler moving in a radial direction inside the rotor by insertion and extraction of a mechanical key into and from the rotor, wherein the sleeve comprises a hole not engaged with the tumbler by the insertion of the mechanical key and engaged by the extraction of the mechanical key, and a dividing wall formed at a middle of the hole, the dividing wall receiving the tumbler, and wherein a part of the dividing wall is engaged with a recessed groove formed on an inner peripheral surface of the rotor case.

In the above embodiment (1) of the invention, the following modifications and changes can be made.

(i) The dividing wall comprises a first dividing wall portion receiving the tumbler and a second dividing wall portion engage with the recessed groove.

(ii) The dividing wall and the recessed groove define an illegal rotation preventing portion that prevents the sleeve from moving beyond a predetermined position and from rotating together with the rotor.

(iii) The part of the dividing wall is formed over an entire length of the hole in a longitudinal direction of the sleeve.

(iv) The part of the dividing wall is formed over an entire length of the sleeve in a longitudinal direction of the sleeve.

Effects of the Invention

According to an embodiment of the invention, a key cylinder device can be provided that the strength of cylinder can be increased without increasing the size of the entire device.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A preferred embodiment of the invention will be specifically described below in conjunction with the appended drawings. In the following description, front means a key insertion hole side of a key cylinder, rear means a rear side of the key insertion hole, and upper, lower, left and right are directions when viewing the key insertion hole from the front.

General Configuration of Key Cylinder Device

Figure 1:
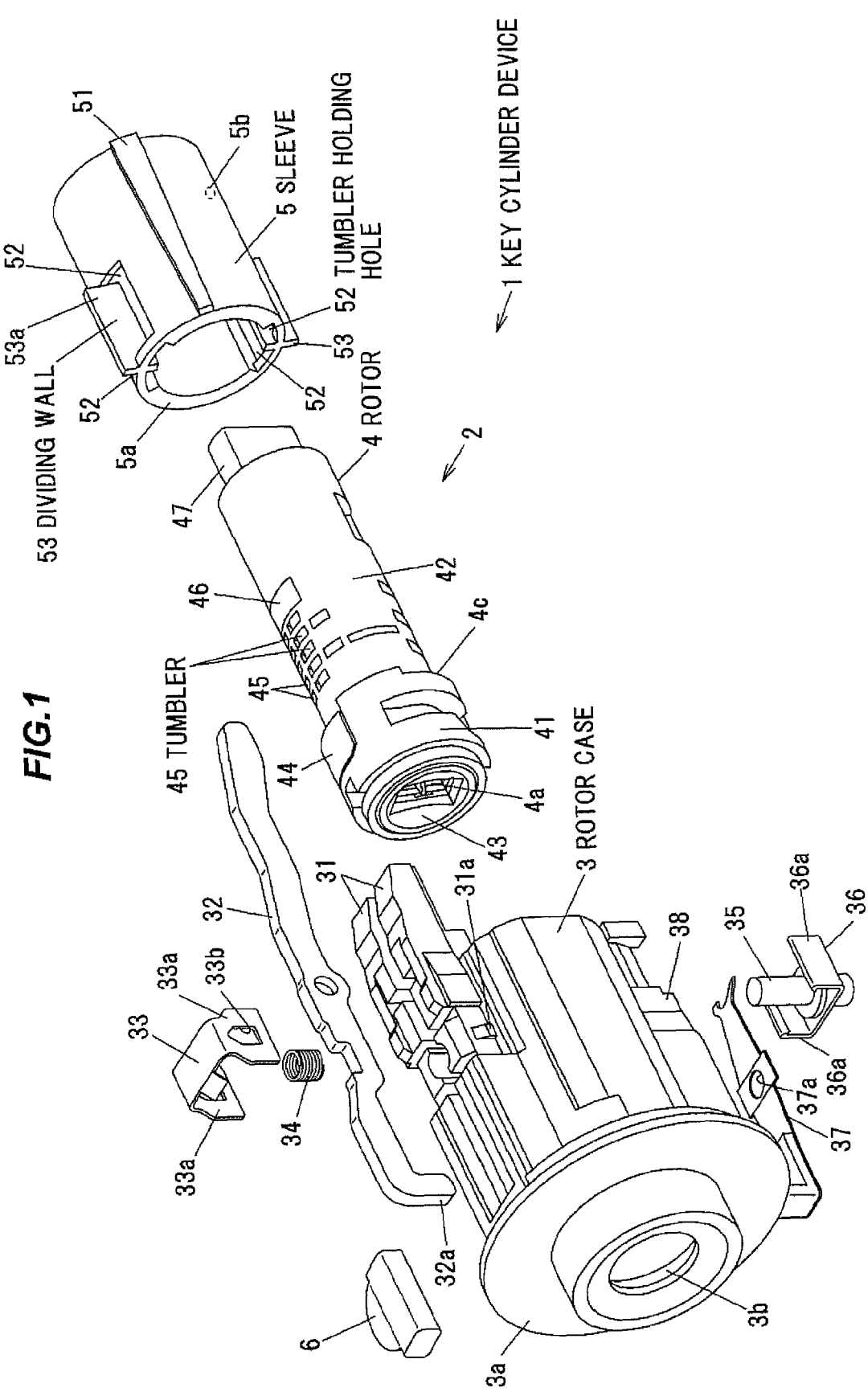
FIG. 1 is a exploded perspective view schematically showing a key cylinder device in a preferred embodiment of the present invention.

FIG. 1 shows a configuration example of a typical key cylinder device in the present embodiment which is indicated generally by the reference numeral 1. The key cylinder device 1 is an ignition cylinder for changing the states of various on-vehicle devices and an engine, and is arranged, e.g., inside a lock body of a steering lock device which is attached to a steering post of a vehicle.

The key cylinder device 1 is provided with a key cylinder 2 capable of mechanical authentication of a mechanical key (not shown) (hereinafter, referred to as "key"). Rotational operation of the key changes the position of the key cylinder 2 between first to fourth positions which are an LOCK position, an ACC (accessory) position, an ON position and a START position in a clockwise direction when viewing from the front.

The steering lock device is locked when the key cylinder 2 is located at the LOCK position, and is unlocked when the key cylinder 2 is located at any position from the ACC position to the START position.

The key cylinder 2 is coupled to a camshaft which is a component of the steering lock device to operate an ignition switch (not shown). When the key cylinder 2 is rotationally operated from the LOCK position through the ACC position to the ON position or the START position, connection of the contact point of the ignition switch is switched via the camshaft Based on the connection state of the ignition switch changed by the switching operation, the status of various on-vehicle devices and an engine is switched.

(Configuration of the Key Cylinder)

Figure 2:
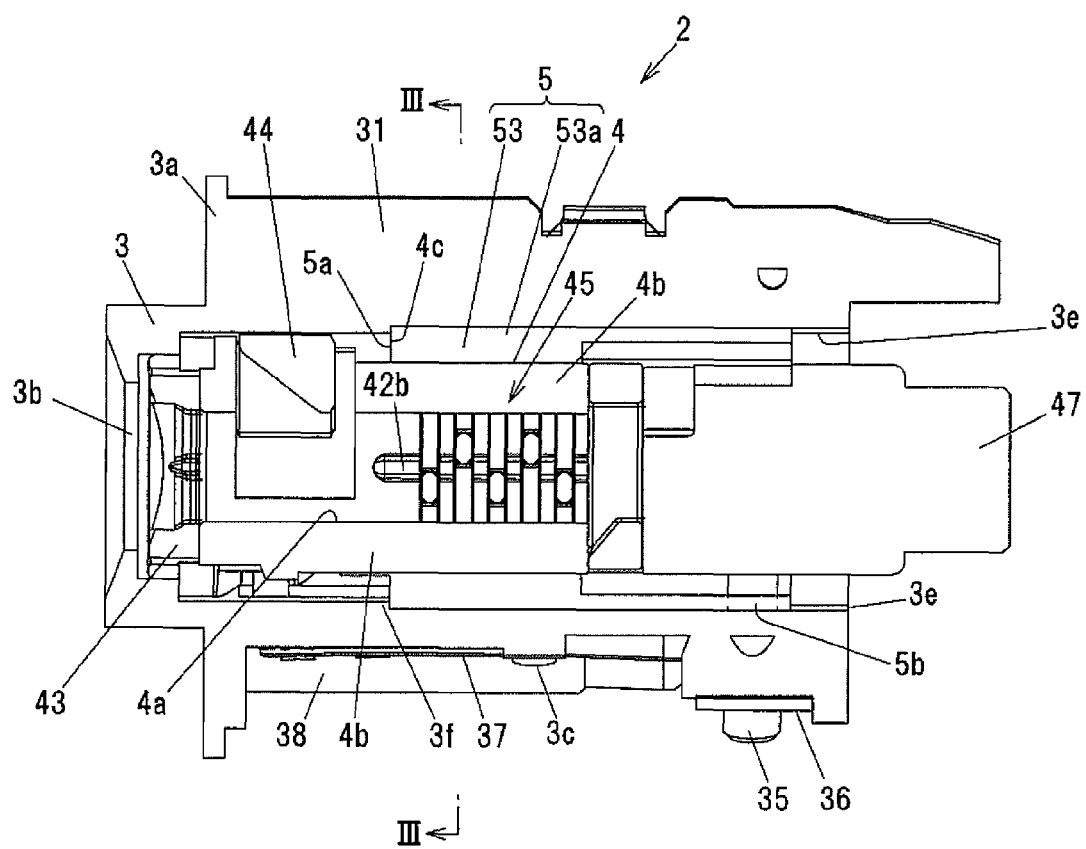
FIG. 2 is a partial cross sectional view showing the internal structure of the key cylinder device.

As shown in FIGS. 1 and 2, the key cylinder 2 is provided with a cylindrical rotor case 3 having an opening on the rear side opposite to a key insertion side, a columnar rotor 4 rotatably housed in the rotor case 3, and a cylindrical sleeve 5 fitted to an outer peripheral surface of the rotor 4 and inserted and fixed to an inner peripheral surface of the rotor case 3.

The key cylinder 2 has a multiple cylindrical wall structure composed of the rotor case 3, the rotor 4 and the sleeve 5. The rotor 4 is assembled to the rotor case 3 in a direction opposite to the key insertion direction and this increases resistance of the rotor 4 to pull-out from the rotor case 3.

Configuration of the Rotor Case

The rotor case 3 is formed of a cylindrical member with a circular flange-shaped case and has a key operation hole 3b on a flange portion 3a of the cylindrical member with case. A constituent material of the rotor case 3 is, e.g., a metal material such as die-cast zinc or a resin material such as glass-fiber containing polybutylene terephthalate (PBT) resin.

The rotor case 3 is housed and fixed, via a wobble-inhibiting packing member 6, inside the cylindrical lock body as a mounting member which is integrally formed of a metal material such as die-cast zinc. A packing insertion portion (not shown) to which the packing member 6 is inserted and fixed is formed to protrude from a lock body-facing surface of the rotor case 3.

A support wall 31 having a recess along the key insertion direction is formed on an upper peripheral portion of the rotor case 3, and a locking lever 32 is pivotably supported inside the recess of the support wall 31. The locking lever 32 has, e.g., a key insertion detection function for detecting insertion of a key and a lock function for holding a locking member such as locking bar or lock stopper which enables or disables a rotating operation of the column shaft.

To the locking lever 32, a coil spring 34 is attached in a state of being covered with a cover plate 33 having a pair of right and left leg portions 33a. Protrusions 31a formed to protrude from the right and left sides of the support wall 31 of the rotor case 3 are snap-fitted into and fixed to holes 33b formed on the pair of right and left leg portions 33a of the cover plate 33, and the locking lever 32 is pressed toward the rotor 4 by a spring force of the coil spring 34.

A stopper pin 35 used for attaching the key cylinder to the lock body (not shown) penetrates the lower peripheral portion of the rotor case 3 so as to be movable in a radial direction of the rotor. The stopper pin 35 is attached to a stopper cover 36 having a pair of right and left leg portions 36a which are snap-fitted and fixed to a vertical wall 38 having a recess and formed upright on the outer side surface of the rotor case 3.

The stopper pin 35 is pressed toward the lock body by an elastic force of a lever 37 which is fixed at one end to the rotor case 3. The lever 37 is fixed to an attachment pin 3c which is formed in the recess of the vertical wall 38 of the rotor case 3 and protrudes through an attachment hole 37a.

Configuration of the Rotor

The rotor 4 rotatably housed in the rotor case 3 has a shape with a step such that a large diameter rotor portion 41 having a key insertion detection function and a small diameter rotor portion 42 having a key checking function for checking a mechanical match of a key are integrally coupled with a level difference portion therebetween. A key insertion hole 4a is formed along a direction of the rotor rotation axis in the large diameter rotor portion 41 and the small diameter rotor portion 42.

A block 43 having a key insertion slot and provided to prevent the insertion hole from being broken is housed in and fixed to a front opening of the large diameter rotor portion 41. A sliding piece 44 is housed in the peripheral portion of the large diameter rotor portion 41 so as to be movable in the radial direction of the rotor when inserting/extracting the key, and a bent piece 32a formed by bending a front end of the locking lever 32 is arranged to face the outer surface of the sliding piece 44.

Meanwhile, plural tumblers 45 having a long plate shape and a locking piece 46 for preventing a rotation of the camshaft are housed inside the small diameter rotor portion 42 so as to be resiliently retractable. A rectangular coupling portion 47 to be engaged with the camshaft is provided at the rear portion of the rotor 4 so as to protrude along the rotor rotation axis.

Figure 3:
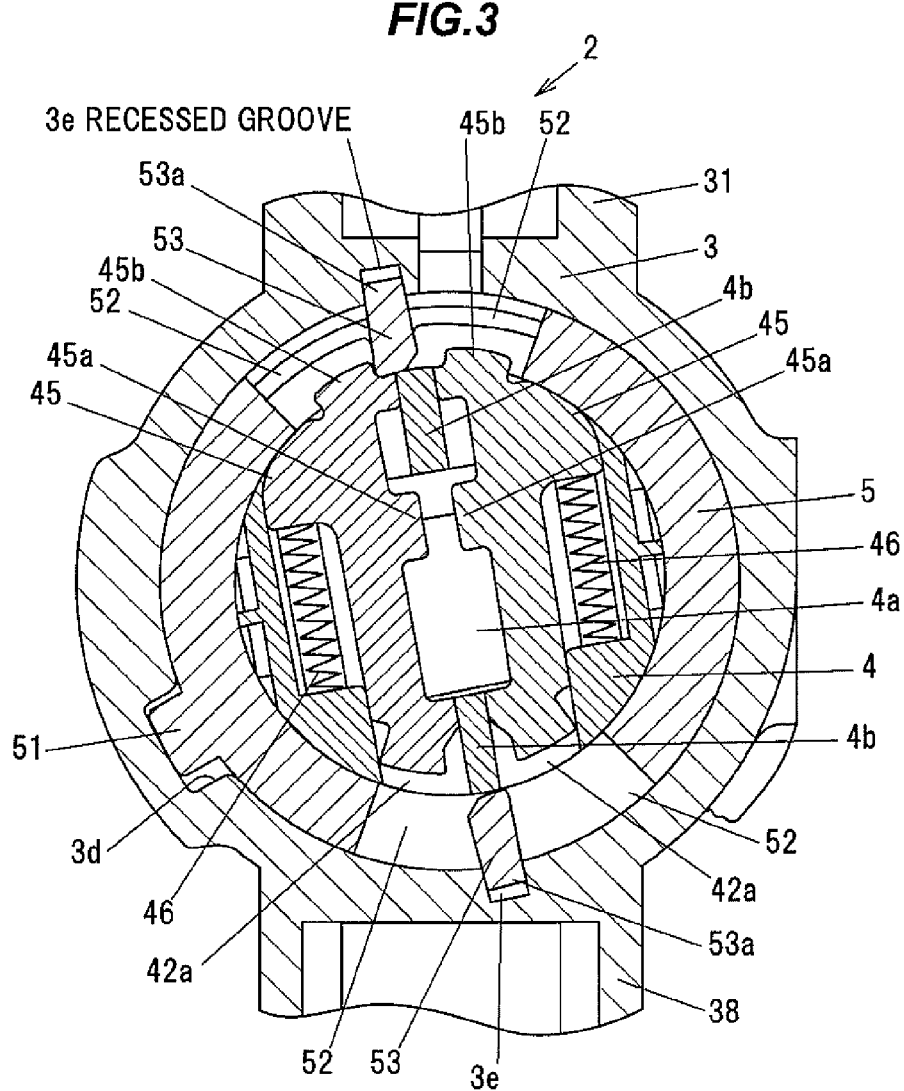
FIG. 3 is an enlarged cross sectional view taken along a line III-III in FIG. 2 and viewed in a direction of an arrow connected to the line.

Inside the key insertion hole 4a of the small diameter portion 42, a pair of upper and lower partition walls 4b extending along the direction of the rotor rotation axis are formed to face each other with a predetermined distance in the radial direction of the rotor as shown in FIGS. 2 and 3, and plural tumbler receiving holes 42a are arranged so as to sandwich the partition walls 4b. A pair of right and left tumbler receiving holes 42a is configured as a set of housing spaces, and plural sets of housing spaces are provided at predetermined intervals along the direction of the rotor rotation axis.

Inside the key insertion hole 4a of the small diameter rotor portion 42, a pair of guide protrusions 42b extending along the direction of the rotor rotation axis protrude radially inward from right and left surfaces so that the key is guided in the key insertion hole 4a by the guide protrusions 42b.

The tumbler 45 housed in the tumbler receiving hole 42a of the small diameter rotor portion 42 comprises half tumblers split into right and left, as shown in FIG. 3. Tumbler protrusions 45a causing movement in the radial direction of the rotor when inserting/extracting the key are formed to protrude from opposing end faces of the tumbler 45, and protruding ends 45b retractable through the tumbler receiving hole 42a of the small diameter rotor portion 42 are formed to protrude from the tumbler 45.

Due to engagement of the tumbler protrusions 45a with key grooves formed on both the front and back surfaces of the key, the tumblers 45 are elastically held, via a coil spring 46, inside the tumbler receiving holes 42a of the small diameter rotor portion 42 at a predetermined position to be a key checking position for checking a mechanical match of the key.

In the state that the key is not inserted into the key insertion hole 4a, the protruding ends 45b of the tumblers 45 protrude beyond the opening edges of the tumbler receiving holes 42a of the small diameter rotor portion 42 and rotation of the rotor 4 is restricted by engagement of the protruding ends 45b with the sleeve 5.

In the state that the key is inserted into the key insertion hole 4a, all tumblers 45 are engaged with the grooves of the key and thereby retract into the rotor 4 on the inner side of the opening edges of the tumbler receiving holes 42a. As a result, the rotor 4 can be rotationally operated without contact of any tumblers 45 with the sleeve 5.

Configuration of the Sleeve

In such a key cylinder 2, the shape and number of the tumblers 45 are different depending on the shape of key, and the rotor 4 needs to be changed according to the shape and number of the tumblers 45. Then, changing the rotor 4 involves change of the shape of the rotor case 3 since the key insertion detection function and the lock function of the locking lever 32 are realized by the shape of the rotor case 3.

Based on this, in the present embodiment, the cylindrical metal sleeve 5 is used to allow the rotor case 3 to have compatibility even when the rotor 4 is changed to match a different shape of key. The position of the sleeve 5 to restrict rotation of the rotor 4 is set to correspond to a changed key shape.

In FIGS. 1 to 3, a guide rib 51 having a tapered shape protrudes from the outer peripheral surface of the sleeve 5 and extends in the insertion direction over the entire length of the sleeve 5. The guide rib 51 is inserted along the direction of the rotor rotation axis into a guide recess 3d formed on the inner peripheral surface of the rotor case 3. Such a configuration prevents incorrect insertion of the sleeve 5 into the rotor case 3.

Plural tumbler holding holes 52 elongated in the direction of the rotor rotation axis are formed on two sides so as to penetrate the peripheral portion of the sleeve 5. Each tumbler holding hole 52 is divided into two sections by a dividing wall 53 which formed to bridge the tumbler holding hole 52 and receives the protruding ends 45b of the tumblers 45. The tumbler holding holes 52 serve to allow the protruding ends 45b of the tumblers 45 to be disengaged when the key is inserted, and to be engaged when the key is extracted.

The sleeve 5 is formed to have a size (outer diameter) and a thickness which match the shape of a key to be used and the type and number, etc., of the tumblers 45, and the suitable number of the tumbler holding holes 52 having a suitable size and arranged at suitable positions are selected and used according to the shape of the key to be used and the type and number, etc., of the tumblers 45. It is therefore obvious that the positions and number, etc., of the tumbler holding holes 52 are not limited to those in the illustrated example.

By providing the sleeve 5 which is fitted to the outer peripheral surface of the rotor 4 and is inserted and fixed to the inner peripheral surface of the rotor case 3, it is possible to reduce the accuracy level of components having the key insertion detection function and the lock function when changing the shape of a key to be used and the type and number, etc., of the tumblers 45, and it is thus possible to suppress the cost increase.

Even when the rotor 4 is changed to match a different key shape, it is possible to reduce the types of components since the sleeve 5 has a function of allowing the rotor case 3 to have compatibility.

Since it is possible to reduce the types of components, it is possible to reduce frequency of changing setup for component assembly and thus possible to reduce man-hours to assemble the components.

Structure of Preventing the Illegal Rotation of the Key Cylinder

In the locked state in which the key is not inserted into the key insertion hole 4a of the rotor 4, the protruding ends 45b of the tumblers 45 are engaged with the dividing walls 53 which divide the tumbler holding holes 52 of the sleeve 5, and the rotor 4 is thereby restricted from rotating. In this configuration, however, since the dividing walls 53 dividing the tumbler holding holes 52 are formed to bridge the tumbler holding holes 52, the dividing walls 53 have a small cross sectional area in the circumferential direction and thus have a relatively low strength.

Due to such a structure, when an inappropriate action is carried out to unlock the key cylinder 2 by, e.g., applying a strong force to the dividing walls 53 of the sleeve 5 via the tumblers 45 which rotate with forcible rotation of the rotor 4, the protruding ends 45b of the tumblers 45 may break the dividing walls 53 of the sleeve 5 and may be forcibly disengaged from the tumbler holding holes 52, causing the illegal rotation of the rotor 4 and the resulting illegal unlocking of the key cylinder 2.

The essential feature of the present embodiment is that the rotor case 3 and the sleeve 5 as non-rotating members form an illegal rotation preventing portion which prevents the sleeve 5 from moving beyond a predetermined locking position and from rotating together with the rotor 4 even when a strong force is applied to the dividing walls 53 of the sleeve 5 via the tumblers 45 by forcible rotation of the rotor 4.

In the illustrated example, the sleeve 5 has the dividing walls 53 as first dividing wall portions each formed to bridge the tumbler holding hole 52 in the middle and locking walls 53a as second dividing wall portions each formed at an edge portion of the dividing wall 53 on the rotor case 3 side. The locking wall 53a protrudes from the opening edge of the tumbler holding hole 52 and is arranged over the entire length of the tumbler holding hole 52. The protruding dimension of the locking wall 53a is, e.g., about 0.7 mm.

The locking walls 53a function as reinforcing ribs to ensure strength of the dividing walls 53 of the sleeve 5 and are inserted and fixed to recessed grooves 3e formed on the inner peripheral surface of the rotor case 3 along the direction of the rotor rotation axis. The recessed grooves 3e extend from the rear opening edge of the rotor case 3 to an annular step surface 4c formed between the large diameter rotor portion 41 and the small diameter rotor portion 42. The depth dimension of the recessed groove 3e is, e.g., about 0.9 mm.

Inserting and fixing the sleeve 5 to the recessed grooves 3 of the rotor case 3 using the locking walls 53a of the dividing walls 53 allows not only the sleeve 5 but also the rotor case 3 to be capable of receiving a strong force. Strength of the dividing walls 53 depends on the locking position, etc., of the locking wall 53a relative to the recessed groove 3e.

The locking walls 53a of the dividing walls 53 and the recessed grooves 3e of the rotor case 3 are configured to form the illegal rotation preventing portion for preventing the rotor 4 from rotating by an inappropriate action so that attack resistance to withstand rotational force of the rotor 4 by an inappropriate action is prevented from decreasing. It is possible to prevent illegal rotation of the rotor 4 and thus possible to reliably prevent the sleeve 5 from being broken.

Meanwhile, the guide rib 51 of the sleeve 5 is loosely fitted to the guide recess 3d of the rotor case 3 as shown in FIG. 3 so as to movable in the circumferential direction inside the guide recess 3d within the range of the gap of the loose fitting. This prevents the contact between the guide rib 51 and the guide recess 3d and allows the recessed grooves 3e of the rotor case 3 to reliably receive a rotational force acting on the dividing walls 53 of the sleeve 5, and it is thereby possible to reliably prevent the sleeve 5 from being broken.

A locking hole 5b is formed to penetrate a rear opening end portion of the sleeve 5 so that the stopper pin 35 penetrating the lower peripheral portion of the rotor case 3 is fitted and fixed. The stopper pin 35 penetrating the lower peripheral portion of the rotor case 3 is fitted to the locking hole 5b to prevent the sleeve 5 from being pulled out.

An opening end face 5a located on the front side of the sleeve 5 is configured as a stopping surface which comes into contact with the step surface 4c of the rotor 4 and also with an annular stepped portion 3f formed on the inner peripheral surface of the rotor case 3 and located behind the flange portion 3a, and thereby prevents the rotor 4 from being pulled out.

The opening end face 5a located on the front side of the sleeve 5, the annular stepped portion 3f of the rotor case 3, the step surface 4c of the rotor 4 and the stopper pin 35 prevent a decrease in attack resistance of the rotor 4 and the sleeve 5 against being pulled out. Thus, attack resistance is improved such that the rotor 4 and the sleeve 5 cannot be pulled out even when the flange portion 3a of the rotor case 3 is broken.

Effects of the Embodiments

The key cylinder device 1 configured as described above exerts the following effects, in addition to the effects described above.

While using a simple structure to prevent the rotation of the rotor 4 by an inappropriate action, it is possible to effectively meet the safety standard for road trucking vehicle or interior fitting regulations such as public notice defining the details of the equipment format specification rule or the safety standard for road trucking vehicle.

It is possible to increase strength only by partially increasing the radial thickness of the sleeve 5. Since it is not necessary to increase the diameter or thickness of the entire sleeve 5 to increase strength, it is possible to avoid an increase in size of the key cylinder 2.

By the simple structure in which the dividing walls 53 of the sleeve 5 are inserted and fixed to the recessed grooves 3e of the rotor case 3 along the direction of the rotor rotation axis, it is possible to satisfy the required strength and also possible to downsize the key cylinder 2.

Modifications

Although the locking wall 53a has a rib shape and is formed over the entire length of the tumbler holding hole 52 of the sleeve 5 in the embodiment and the illustrated example, it is not limited thereto. As another example, the locking wall 53a for reinforcing strength of the dividing wall 53 of the sleeve 5 is formed to extend over the entire longitudinal length of the sleeve 5, as shown in FIG. 4.

Figure 4:
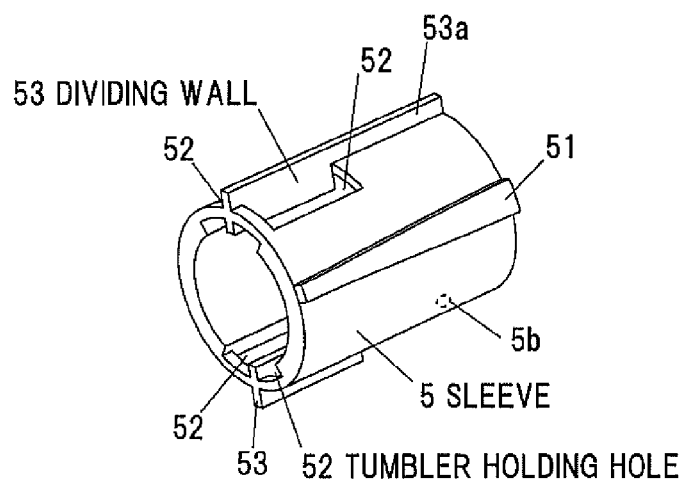
FIG. 4 is a perspective view schematically showing a modification of the key cylinder device.

The example shown in FIG. 4 is different from the embodiment in that the locking wall 53a of the sleeve 5 is provided to extend over the entire longitudinal length of the sleeve 5, but the remaining structure is substantially the same.

When adapting the configuration in Modification, the recessed groove 3e of the rotor case 3 into which the locking wall 53a of the dividing wall 53 is inserted is formed long enough to correspond to the locking wall 53a formed over the entire longitudinal length of the sleeve 5, and it is thereby possible to reinforce the strength of the dividing wall 53 of the sleeve 5.

Although the key cylinder device 1 is applied to a car in the typical configuration example of the invention, it is not limited thereto. It is obvious that the invention can be effectively applied to, e.g., various vehicles such as construction machineries and agricultural machineries.

It is obvious from the above description that the invention according to claims is not to be limited to the typical embodiment, modification and illustrated examples of the invention. Therefore, it should be noted that all combinations of the features described in the embodiment, modification and illustrated examples are not necessary to solve the problem of the invention.

What is claimed is:

1. A key cylinder device, comprising:
   a cylindrical rotor case;
   a rotor rotatably enclosed in the rotor case;
   a sleeve fixedly disposed between the rotor and the rotor case; and
   a tumbler moving in a radial direction inside the rotor by insertion and extraction of a mechanical key into and from the rotor,
   wherein the sleeve comprises a hole not engaged with the tumbler by the insertion of the mechanical key and engaged by the extraction of the mechanical key, and a dividing wall formed at a middle of the hole, the dividing wall receiving the tumbler, and
   wherein the sleeve is formed separately from the rotor case and non-rotatably mounted therein by a part of the dividing wall being inserted into and fixed in a recessed groove formed on an inner peripheral surface of the rotor case along a direction of a rotor rotation axis thereby locking the sleeve so as to rotate with the rotor case.

2. The key cylinder device according to claim 1, wherein the dividing wall comprises a first dividing wall portion receiving the tumbler and a second dividing wall portion engage with the recessed groove.

3. The key cylinder device according to claim 1, wherein the dividing wall and the recessed groove define an illegal rotation preventing portion that prevents the sleeve from moving beyond a predetermined position and from rotating together with the rotor.

4. The key cylinder device according to claim 1, wherein the part of the dividing wall is formed over an entire length of the hole in a longitudinal direction of the sleeve.

5. The key cylinder device according to claim 1, wherein the part of the dividing wall is formed over an entire length of the sleeve in a longitudinal direction of the sleeve.

\* \* \* \* \*